Oct. 3, 1961  C. R. TAYLOR  3,002,504
FLUID MOTOR

Filed May 27, 1959  5 Sheets-Sheet 1

CLARENCE R. TAYLOR
INVENTOR.

BY

ATTORNEY

Oct. 3, 1961     C. R. TAYLOR     3,002,504
FLUID MOTOR

Filed May 27, 1959     5 Sheets-Sheet 2

CLARENCE R. TAYLOR
INVENTOR.

BY

ATTORNEY

Oct. 3, 1961

C. R. TAYLOR 3,002,504

FLUID MOTOR

Filed May 27, 1959

CLARENCE R. TAYLOR
INVENTOR.

BY

ATTORNEY

Oct. 3, 1961

C. R. TAYLOR 3,002,504

FLUID MOTOR

Filed May 27, 1959

CLARENCE R. TAYLOR
INVENTOR.

BY

ATTORNEY

United States Patent Office 3,002,504
Patented Oct. 3, 1961

3,002,504
FLUID MOTOR
Clarence R. Taylor, 1632 Penfield Road, Rochester, N.Y.
Filed May 27, 1959, Ser. No. 816,303
25 Claims. (Cl. 121—59)

This invention relates generally to motors, and more specifically to an improved fluid motor.

Fluid motors of the type depending upon a pressurized liquid or gaseous working medium for its operation are generally well known in the art. Such motors are normally of rather complicated construction, requiring parts machined to extremely close tolerances, and further necessitating the use of expensive ball bearings to reduce friction between the moving parts. In addition to the bearings, these motors require costly and complicated seals to prevent leakage of the working medium, and also utilize valves and passage means such as ports and ducts for the working medium independent of the seals and bearings thereby increasing the number of motor parts, size and cost of the motor. Applicant's improved fluid motor is believed to obviate these and other disadvantages of prior known fluid motors.

The primary object of the present invention is to provide a fluid motor that is of simple design and construction, thoroughly reliable and efficient in operation, and economical to manufacture.

Another object of the invention is to provide a fluid motor having a high torque at very low revolutions per minute (r.p.m.) of the motor.

Still another object of the invention is the provision of an improved fluid motor having a ring interposed between two members, one of which is movable relative to the other, and adapted to function as a seal, bearing and fluid directing member.

One more object of the invention is to provide a fluid motor that will operate at high efficiency at very low r.p.m.

Another object of the invention is to provide a fluid motor having a valve collar axially movable between a first position in which a first member of the motor is driven while a second member is fixed, to a second position in which the second member of the motor is driven while the first member is fixed.

A further object of the invention is to provide an improved fluid motor in which the valve collar is axially movable between first and second position, and is selectively rotatable between drive, free-wheeling, and brake positions in each of the first and second positions.

A further object of the invention is to provide an improved fluid motor that can provide immediate power at low r.p.m. without the necessity of gearing or belting down.

Another object of the invention is to provide a fluid motor adapted to be powered for a considerable period of time from a container of compressed fluid.

An additional object of the invention is to provide an improved fluid motor selectively adapted to drive either from the main body of the motor or from its main axle.

With the foregoing and other objects in view, this invention comprises certain novel construction, combination, and arrangement of parts as will be hereinafter fully described, illustrated in the accompanying drawings, and more particularly pointed out in the appended claims.

Figure 3:
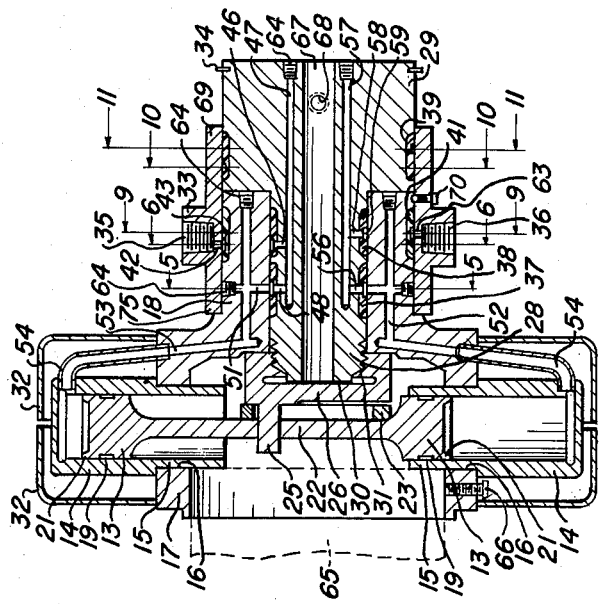
FIG. 3 is a vertical sectional view substantially taken on line 3—3 of FIG. 1 and looking in the direction of the arrows.
Figure 4:
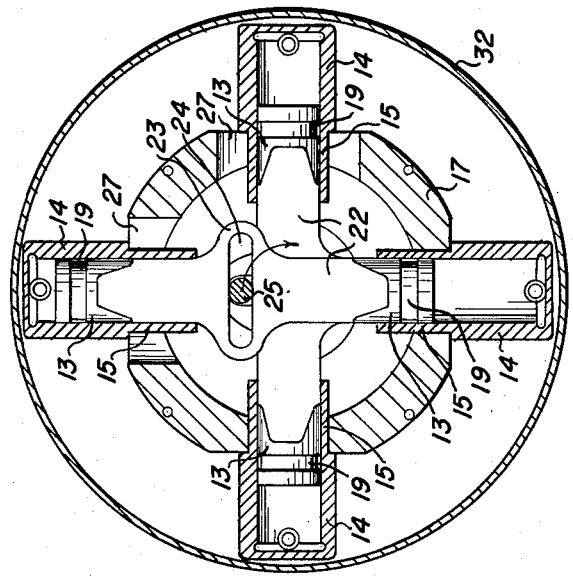
FIG. 4 is a central, vertical sectional view taken substantially on line 4—4 of FIG. 1 and looking in the direction of the arrows.

Referring to the preferred embodiment of the invention shown in the drawings, a plurality of motor pistons 13 as best seen in FIGS. 3 and 4 are reciprocally movable within piston cylinders 14. Each cylinder 14 has one end 15 of reduced diameter insertable in a radially extending opening 16 formed by an annular projection 17 of annular body member 18, and is rigidly secured thereto by any suitable means. Each piston 13 is provided with relief areas 19 to reduce the surface contact area between each piston 13 and corresponding cylinder 14 for reducing frictional drag. Each piston 13 is further provided at its outer end with flanges 21 to form an air seal when the air pressure forces them into engagement with the cylinder walls of cylinders 14. The greater the air pressure, the better the seal and yet when the motor is in a free-wheeling position, pistons 13 slide freely in cylinders 14.

Each pair of diametrically opposed pistons 13 and a common piston rod 22 interconnecting the pistons are formed as a unitary member of a plastic material such as nylon or any other suitable material, and are preferably injection molded. Each piston rod 22 has an enlarged portion 23 provided with a slot 24 for receiving a crank pin 25 formed by a threaded coupling 26. The projection 17 has a pair of elongated slots 27 as seen in FIG. 4 to permit passage of portion 23 when piston rods 22 and cylinders 14 are mounted on projection 17. The coupling 26 is in the form of a cap or cover having a substantially U-shaped cross section and is threaded onto the end of a cylindrical axle 28 and adapted when tightened thereon to properly position axle 28 and pin 25 with respect to pistons 13 so that they are in proper working relationship. By means of shims 30 only one of which is shown, interposed between coupling 26 and axle 28, it is possible to adjustably vary the position of pin 25 with respect to axle 28 and accordingly vary the working relationship between axle 28 and piston 13. The axle 28 further has an enlarged head 29 whose outside diameter is equal to the outside diameter of body member 18. The crank pin 25 and slot 24 connection is adapted to translate the reciprocal movement of pistons 13 into rotary motion of coupling 26 and axle 28.

In addition to coupling 26 being threaded onto axle 28 for driving same, it also serves to prevent body member 18, which is rotatably mounted on axle 28 and interposed between head 29 and coupling 26, from sliding off of axle 28. The motor direction is such as to tend to turn coupling 26 tighter onto axle 28 so there is no danger of the assembly loosening up during operation. Also the threaded connection 31 between coupling 26 and axle 28 is either left or right handed depending on the direction of motor rotation desired. In the drawings, the motor drives axle 28 clockwise as indicated by the arrow in FIG. 4 so that a right hand thread is used. The fluid motor further has a pair of cowl members 32 secured to projection 17 for protectively enclosing cylinders 14 and to give the motor a pleasing and artistic appearance.

Figure 1:
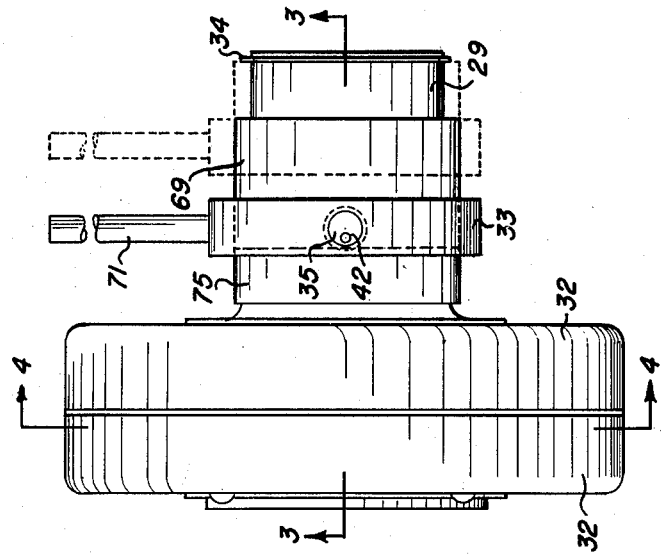
FIG. 1 is a side elevation view showing a preferred embodiment of the fluid motor of this invention.
Figure 2:
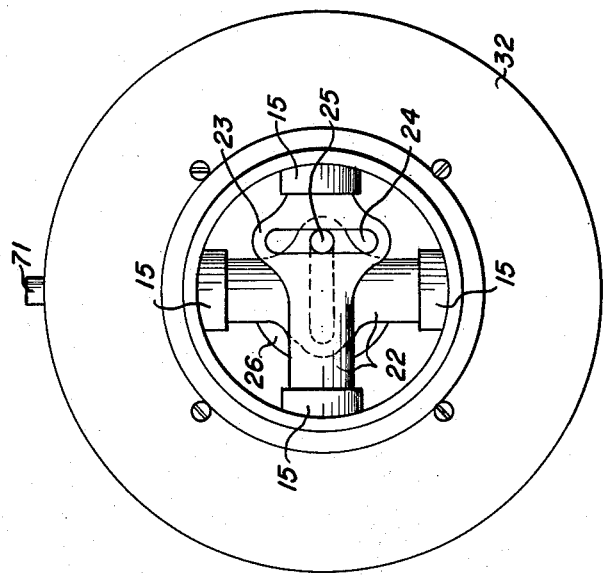
FIG. 2 is an end view of the fluid motor of FIG. 1.

A valve control collar 33 for controlling the operation of the fluid motor is mounted on member 18 and head 29, which as indicated earlier have the same outside diameter, for axial slidable movement as seen in FIG. 1 and rotation as seen in FIGS. 6–9. The control collar 33 may be axially movable between two positions, and in each position rotated selectively into one of three possible positions—drive, free-wheeling, and brake which will be explained in greater detail hereinafter. The collar 33 is retained on member 18 and head 29 by a retainer 34. The pressurized fluid such as air is introduced to the motor through a tapped fluid inlet 35 from any suitable regulated fluid pressure source fluidly connected to inlet 35 by tubing or the like. The fluid pressure source may be a container of pressurized air, not shown, having a suitable built-in lubricating system for introducing an air and lubricant mixture into the motor for lubricating the motor. The fluid is exhausted from the motor through tapped fluid exhaust 36 connected by tubing or the like to a suitable muffler, not shown.

The axle 28 is provided with annular, fluid distributing rings 37, 38 and 39 formed of molded nylon or other suitable material for guiding the fluid along a predetermined path. In addition to directing and guiding the fluid, rings 37, 38 and 39 provide a seal for the fluid motor preventing it from leaking out of the fluid motor. Also, rings function as a bearing for reducing the friction between the moving parts and eliminating the requirement of expensive ball bearings and the like. The member 18 is provided with an annular molded ring 41 similar to ring 39, and both rings not only direct and guide the fluid, but also serve as valve members to regulate or control the amount of fluid supplied to the fluid motor. Ring 37 also functions as a valve for directing fluid to and from cylinders 14.

Figure 5:
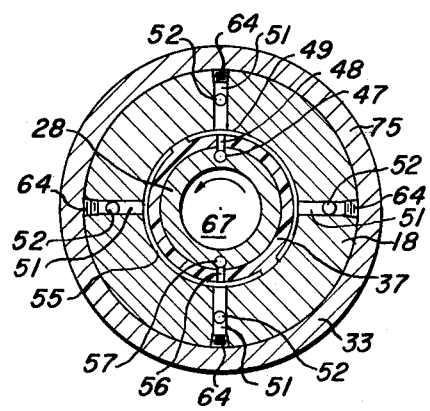
FIG. 5 is an enlarged sectional view taken substantially on line 5—5 of FIG. 3 and looking in the direction of the arrows.
Figure 13:
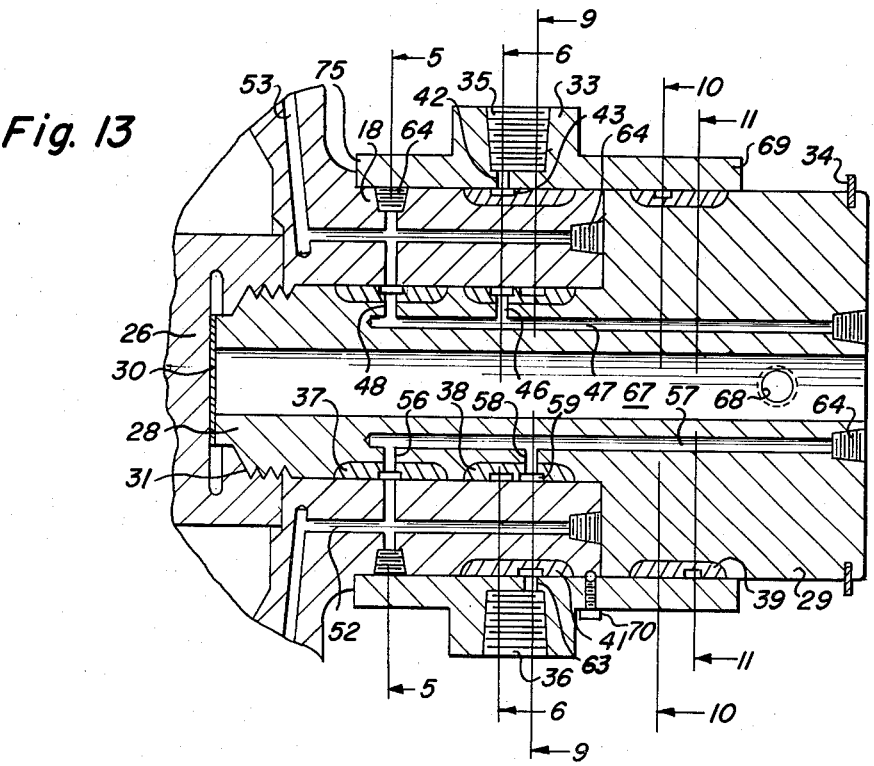
FIG. 13 is an enlarged segmental view of a portion of the structure of FIG. 3.

The fluid path through fluid motor can best be described with reference to FIGS. 3, 5, 8 and 13, assuming that collar 33 has been axially moved into the position seen in FIGS. 3 and 13 and rotatably moved into the drive position. Fluid entering inlet 35 passes through port 42, valve channel 43, radially extending port 44, annular channel 45, port 46, passageway 47, port 48 as best seen in FIG. 5, channel 49 and then progressively through four paths, one for each cylinder 14, including radial passage 51, port 52, duct 53 and conduit 54 to one end of each of the cylinders 14 for driving its piston 13 to the opposite end of the cylinder. As each piston rod 22 and piston 13 are moved, the opposite piston 13 expels fluid from the opposite cylinder 14 through its path of conduit 54, duct 53, port 52, radial passage 51, to exhaust channel 55 and then through port 56, passageway 57, port 58 as best seen in FIG. 9, annular channel 59, radial port 61, channel 62, port 63 and exhaust 36.

Although conduits 54, ducts 53, ports 52, and radial passages 51 have been shown for only two of the cylinders 14 in FIG. 3, it should be clear that the remaining cylinders 14 are provided with similar fluid directing means. The ring 37 serves as a valve with channel 49 progressively directing fluid into cylinders 14 and channel 55 progressively directing the fluid out of the opposite cylinders 14. With axle 28 and member 18 in the position shown in FIG. 5, fluid is being supplied to two adjacent cylinders 14, one of which is beginning to move radially inwardly and the other about half way in. Fluid is being exhausted from the opposite adjacent cylinders 14, one of which is beginning to move radially outwardly, and the other about half way out.

Motor action results from the design of inlet channel 49 and exhaust channel 55 shown in FIG. 5 which supplies air under pressure to cylinders 14 and drains exhaust air from them. All of the fluid passages are designed to obtain maximum efficiency and torque from the motor. Air under pressure enters a particular cylinder 14 just prior to top dead center position of that piston 13 and is exhausted just before top dead center position on the exhaust cycle. Plugs 64 are provided to block off the various ports 52, passages 51 and passageways 47, 57 after they are drilled during the construction of the motor.

The motor is controlled as to speed, power output and method of operation by control collar 33 as best seen in FIGS. 6–11. As indicated earlier, collar 33 is axially movable from a first position shown in full lines in FIG. 1 to a second position shown in dotted lines. In the full line position, member 18 is held stationary or fixed by securing projection 17 to a fixed cylindrical object 65 shown dotted in FIG. 3 by screws 66, only one of which is shown, and axle 28 is driven. Axle 28 has a bore 67 within which a tool or object may be releasably secured by screw 68 for driving same. In the dotted position, axle 28 is fixed by screw 68 to any suitable rigid, stationary rod, not shown, received by bore 67, and member 18 is rotatable, and a tool or the like may be releasably secured to projection 17 by screws 66. Furthermore, a fan or the like may be secured to or integrally formed with cylinders 14 and annular projection 17. Also, in each axial position, collar 33 may be rotated into drive, free-wheeling and brake positions.

Figure 6:
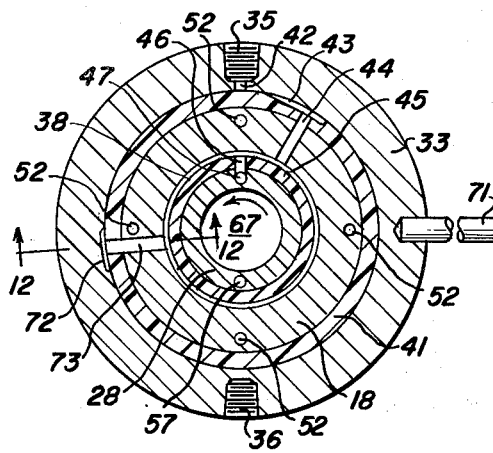
FIG. 6 is an enlarged sectional view taken substantially on line 6—6 of FIG. 3 looking in the direction of the arrows and with the motor in a free-wheeling position.
Figure 12:
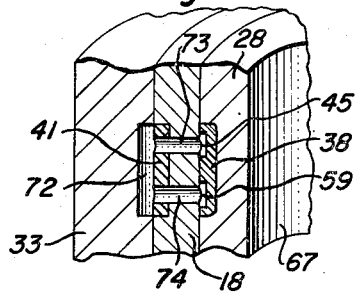
FIG. 12 is a segmental sectional view taken substantially along line 12—12 of FIG. 6

In the operation of this invention, let us assume that projection 17 is fixed to some suitable stationary object 65 as seen dotted in FIG. 3, and that axle 28 is free to rotate. Also, that valve collar 33 is in the full line position of FIGS. 1 and 3 with a side flange 69 thereof covering ring 39 making it inoperative, and that collar 33 is rotated by a handle 71 into the free-wheeling position shown in FIG. 6. A detent means 70 as shown in FIG. 3 may be provided for releasably holding collar 33 in drive, free-wheeling and brake positions with respect to member 18 or with axle 28. In the free-wheeling position, the fluid being supplied to inlet 35 cannot enter channel 43. Also, in this position, a slot 72 in collar 33 connects radial opening 73 to radial opening 74 as best seen in FIGS. 6, 9 and 12. Consequently, axle 28 may be manually rotated in either direction freely since fluid in any cylinder 14 will pass through conduit 54, duct 53, port 52, radial passage 51, channel 55, port 56, passageway 57, port 58, channel 59, opening 74, slot 72, opening 73, channel 45, port 46, passageway 47, port 48, channel 49, radial passage 51, port 52, duct 53, and conduit 54 into the diametrically opposed cylinder 14.

Figure 7:
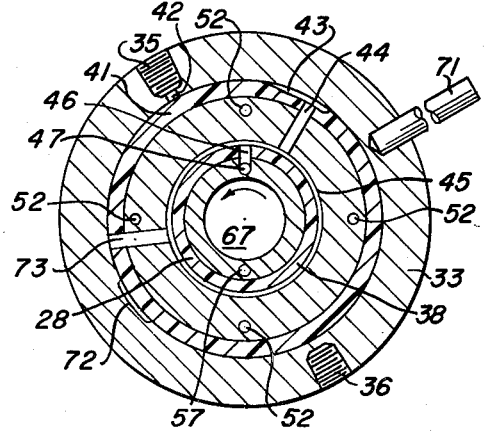
FIG. 7 is an enlarged sectional view similar to FIG. 6 with the motor in a brake position.

When collar 33 is moved by handle 71 into the brake position shown in FIG. 7, fluid still cannot enter the motor through inlet 35. In this position, slot 72 is out of alignment with radial openings 73, 74 so that the fluid is unable to move from one cylinder 14 to the diametrically opposed cylinder 14. As a result, the fluid is trapped within each cylinder 14, and since most fluids such as air are relatively incompressible, axle 28 is effectively prevented from being rotated.

Figure 8:
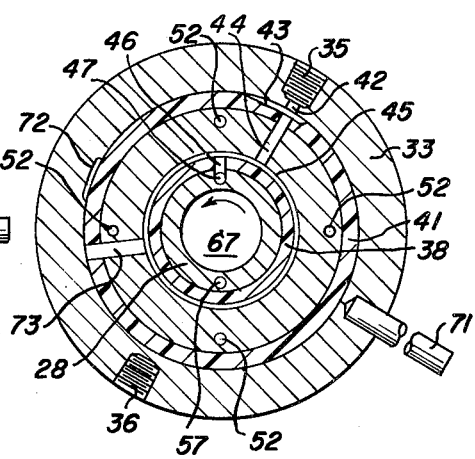
FIG. 8 is an enlarged sectional view similar to FIG. 6 with the motor in a drive position.
Figure 9:
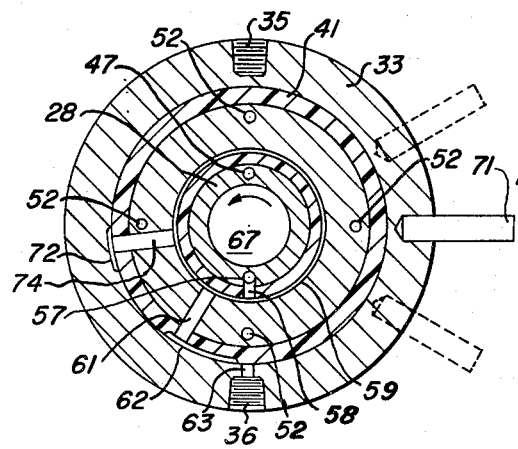
FIG. 9 is an enlarged sectional view taken substantially on line 9—9 of FIG. 3 looking in the direction of the arrows and with the motor in a free-wheeling position.
Figure 10:
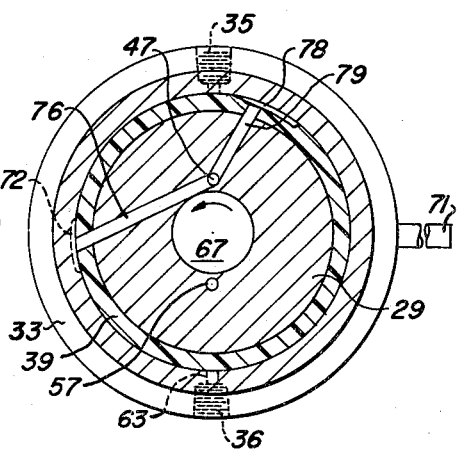
FIG. 10 is an enlarged sectional view taken substantially along line 10—10 of FIG. 3 looking in the direction of the arrows.
Figure 11:
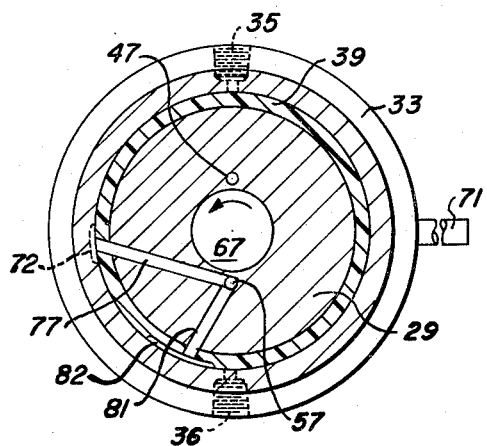
FIG. 11 is an enlarged sectional view similar to FIG. 10 and taken substantially along line 11—11 of FIG. 3 and looking in the direction of the arrows.

Movement of handle 71 and ring 33 into the drive position as seen in FIG. 8 directs the fluid through inlet 35, port 42, channel 43, port 44, channel 45, port 46, passageway 47, port 48, channel 49, and then as axle 28 and ring 33 rotate, directs the fluid through the corresponding radial passage 51, port 52, duct 53 and conduit 54 of each cylinder 14 progressively in 90 degree increments as seen in FIG. 5 for driving the pistons 13, coupling 26 and axle 28. The fluid which is exhausted progressively from each cylinder 14 is directed through its corresponding conduit 54, duct 53, port 52, and radial passage 51 and then through channel 55, port 56, passageway 57, port 58, channel 59, port 61, channel 62, port 63 and exhaust 36. By carefully moving collar 33 with port 42 into fluid connection with channel 43, the operator is able to throttle the compressed fluid supply to the fluid motor and hence vary the speed of the motor in revolutions per minute over a wide range. The motor in FIG. 8 is in a position of maximum r.p.m.

Now let us assume that axle 28 is fixed by a stationary object, not shown, inserted into bore 67 and secured thereto by screw 28, that member 18 is free to rotate, and that collar 33 is axially moved into the dotted position of FIG. 1. In this position, the opposite side flange 75 of collar 33 covers ring 38 so that it is inoperative. Furthermore, detent 72 releasably locks collar 33 to head 29 so that handle 71 and collar 33 are selectively movable into drive, free-wheeling, and brake positions with respect to axle 28. Assuming in FIGS. 10 and 11 that collar 33 is moved into the dotted position of FIG. 1, then the dotted portions of FIGS. 10 and 11 would be in full lines and the collar would be in the free-wheeling position. In this position, fluid cannot enter the motor through inlet 35. However, diametrically opposed cylinders 14 would be fluidly connected through conduit 54, duct 53, port 52, radial passage 51, channel 49, port 48, passageway 47, duct 76, slot 72, duct 77, passageway 57, port 56, channel 55, radial passage 51, port 52, duct 53, and conduit 54. Accordingly, member 18 and cylinders 14 could be manually rotated freely. If handle 71 and collar 33 should now be moved into the brake position, slot 72 would no longer fluidly connect duct 76, 77 so that the fluid is trapped within each cylinder 14. Accordingly, member 18 and cylinders 14 would be effectively prevented from rotating. Moving handle 71 and collar 33 into the drive position with collar 33 still in the dotted position of FIG. 1 directs the fluid through inlet 35, port 42, channel 78, duct 79, passageway 47, port 48, channel 49 and then progressively through the corresponding radial passage 51, port 52, duct 53 and conduit 54 of each cylinder 14 for driving member 18 and cylinders 14 since axle 28 and coupling 26 are fixed. The fluid which is progressively exhausted from each cylinder 14 through its corresponding conduit 54, duct 53, port 52, and radial passage 51, passes through channel 55, port 56, passageway 57, duct 81, channel 82, port 63 and out through exhaust 36.

It is readily apparent that this fluid motor may be modified while still retaining the essence of applicant's invention. For instance, it is possible to remove valve collar 33 and rings 39, 41 from the fluid motor and provide a remote valving means connected by flexible ducts to passageways 47, 57. However, the modification of the invention shown in FIG. 1 is the preferred one.

For special purpose motors where it is not necessary to have universal operation, that is either axle 28 or member 18 adapted to be rotated, it will be noted that the construction may be simplified thereby reducing cost. Thus if it were desired to have a special purpose motor with only axle 28 rotating, then valve collar 33 would not require any side flanges 69, 75 and would not be axially movable. Also, ring 39 and ducts 76, 77, 79, and 81 would no longer be necessary. If, on the other hand, a motor was desired with only annular member 18 adapted to be rotated, once again collar 33 would not require side flanges 69, 75 and would not be axially movable. Also, rings 38, 41 and ducts 44, 61, 73, 74 could be eliminated.

Motor size and horse power rating can be established to suit any requirements suited to this type of motor. It can be used with minor changes in valve design to pump air or to draw vacuum when driven by outside means.

While I have described the preferred embodiment of the invention and illustrated the same in the accompanying drawings, certain minor changes or alterations may appear to one skilled in the art to which the invention relates during the extensive manufacture of the same, and I therefore reserve the right to make such alterations or changes as shall favorably fall within the scope of the appended claims.

I claim:

1. In a fluid motor, the combination comprising: a first member; a second member rotatably supported by said first member; oppositely disposed cylinders carried by one of said first and second members, said first and second members further having fluid passage means for successively introducing a fluid under pressure into said cylinders, and successively discharging the fluid therefrom; pistons reciprocally movable in said cylinders and connected to the other of said first and second members; and valve means fluidly connected to said fluid passage means for controlling the introduction of said fluid therein and selectively movable between a first position for controlling the rotation of said first member with second member fixed, and a second position for controlling the rotation of said second member with said first member fixed.

2. The invention according to claim 1 wherein said pistons are integrally formed with a common piston rod; a coupling is releasably secured to said first member; and said piston rod is connected to said coupling by a pin and slot connection.

3. The invention according to claim 2 wherein said coupling has a substantially U-shaped cross section and is threaded onto one end of said first member, and is adapted to retain said second member onto said first member.

4. The invention according to claim 1 wherein said valve means comprises a collar rotatably mounted on said fixed member and having a fluid inlet and outlet adapted to cooperate with a ring mounted on said fixed member.

5. The invention according to claim 4 wherein said ring has fluid channels fluidly connected to said passage means, and said collar has a slot and is selectively rotatably movable into (1) a drive position with said channels in register with said inlet and outlet for introducing said fluid under pressure into said cylinders and exhausting said fluid from said cylinders for driving said rotatable member, (2) a free-wheeling position with said channels out of register with said inlet and outlet for preventing said fluid from entering said cylinders and said slot fluidly connected to said fluid passage means for fluidly connecting one cylinder to the opposite cylinder to permit manual movement of said rotatable member with respect to said fixed member, and (3) a brake position with said channels out of register with said inlet and outlet to prevent said fluid from entering said cylinders, and said slot disconnected from said fluid passage means for fluidly disconnecting one cylinder from the opposite cylinder to prevent movement of said rotatable member with respect to said fixed member.

6. The invention according to claim 5 wherein said fixed member has first and second ducts fluidly connected to said fluid passage means, and said slot is adapted to fluidly connect said first and second ducts in said free-wheeling position.

7. In a fluid motor, the combination comprising: a first member including a cylindrical axle, said first member providing a first fluid passage means including fluid inlet and exhaust channels formed by first and second peripheral rings mounted on said axle; a second member including an annular body portion mounted on said axle and having an annular projection supporting oppositely disposed cylinders, said second member providing a second fluid passage means for fluidly connecting said cylinders to said first fluid passage means, and said body portion providing a third fluid passage means fluidly connected to one of said first and second peripheral rings; a cylindrical coupling releasably secured to one end of said axle for retaining said body portion on said axle; pistons reciprocally movable in said cylinders and connected to said coupling; and valve means selectively movable between a first position in which said valve means co-operates with said third fluid passage means for controlling the introduction of fluid to said one of said first and second peripheral rings for controlling the rotation of said first member with said second member fixed, and a second position for controlling the introduction of fluid to the other of said first and second peripheral rings for controlling the location of said second member with said first member fixed.

8. The invention according to claim 7 wherein said pistons are integrally formed with a common piston rod, and said piston rod is connected to said coupling by a pin and slot connection.

9. The invention according to claim 8 wherein said coupling is threaded onto one end of said axle and said body portion is interposed between said coupling and said head.

10. The invention according to claim 7 wherein said valve means comprises a collar rotatably mounted on portions of said first and second members and having a fluid inlet and outlet adapted in said first position to cooperate with inlet and outlet channels formed by a third peripheral ring of said third fluid passage means, said third peripheral ring further being mounted on said body portion, and said body portion further forming first and second ports connecting said inlet and outlet channels of said third peripheral ring to said first passage means.

11. The invention according to claim 10 wherein said collar has a slot and is selectively rotatably movable into (1) a drive position with said inlet channel of said third peripheral ring in register with said fluid inlet for introducing said fluid under pressure progressively into said cylinders for driving said first member, and said outlet channel of said third peripheral ring in rigister with said fluid outlet for exhausting said fluid from said cylinders, (2) a free-wheeling position with said inlet channel of said third peripheral ring out of register with said fluid inlet for preventing said fluid from entering said cylinders and said slot fluidly connected to said first fluid passage means for fluidly connecting one cylinder to the opposite cylinder for permitting manual movement of said first member with respect to said second member, and (3) a brake position with said inlet channel of said third peripheral ring out of register with said fluid inlet for preventing said fluid from entering said cylinders, and said slot disconnected from said first passage means for fluidly disconnecting one cylinder from the opposite cylinder to prevent movement of said first member with respect to said second member.

12. The invention according to claim 11 wherein said second member has a first duct fluidly connected to said inlet channel of said third peripheral ring and a second duct fluidly connected to said outlet channel of said third peripheral ring, and said slot is adapted to fluidly connect said first and second ducts in said free-wheeling position.

13. In a fluid motor, the combination comprising: a first member; a second member mounted on said first member and supporting oppositely disposed cylinders, said first and second members having portions thereof of substantially equal outside diameter; pistons reciprocally movable in said cylinders and connected to said first member, said first and second members having fluid passage means for introducing fluid under pressure progressively to each of said cylinders and discharging the fluid from said opposite cylinders; and valve means fluidly connected to said fluid passage means for controlling the introduction of fluid therein and including a collar rotatably mounted on said portions of said first and second members, said collar having a slot adapted to cooperate with said fluid passage means and further being axially movable from a first position for controlling the rotation of said first member with said second member fixed, to a second position for controlling the rotation of said second member with said first member fixed.

14. The invention according to claim 13 wherein said collar in each of said operative positions is rotatably movable into (1) a drive position for driving the rotatable member, (2) a free-wheeling position preventing fluid from entering said cylinders and positioning said slot in fluid connection with said fluid passage means for fluidly connecting one cylinder to the opposite cylinder for permitting manual movement of the rotatable member with respect to the fixed member, and (3) a brake position preventing fluid from entering said cylinders and disconnecting said slot from said fluid passage means for preventing movement of the rotatable member with respect to the fixed member.

15. The invention according to claim 13 wherein said pistons are integrally formed with a common piston rod; a coupling is releasably secured to said first member; and said piston rod is connected to said coupling by a pin and slot connection.

16. The invention according to claim 15 wherein said coupling has a substantially U-shaped cross section and is threaded onto one end of said first member, and is adapted to retain said second member onto said first member.

17. In a fluid motor, the combination comprising: a first member including a cylindrical axle having an enlarged cylindrical head, said first member providing a fluid inlet and fluid outlet passage means including a first peripheral ring having a first fluid inlet channel and first fluid outlet channel, and a second peripheral ring having a second fluid inlet channel and a second fluid outlet channel, said rings being fixedly mounted on said axle and axially spaced apart from one another; a second member including an annular body portion mounted on said axle and having an annular projection supporting oppositely disposed cylinders, said second member providing a second fluid passage means for fluidly connecting said cylinders to said first fluid inlet and fluid outlet channels, one of said first and second members being fixed and the other member rotatable, and said body portion and said head having substantially equal outside diameters; a cylindrical coupling releasably secured to one end of said axle for retaining said body portion on said axle; pistons reciprocally movable in said cylinders and having a common piston rod connected to said coupling by a pin and slot connection; and valve means for controlling the introduction of fluid to said motor including a third peripheral ring fixedly mounted on said body portion and having a third inlet channel fluidly connected to said second inlet channel through a first port provided by said second member, and a third outlet channel fluidly connected to said second outlet channel through a second port provided by said second member, a fourth peripheral ring fixedly mounted on said head and having a fourth inlet channel fluidly connected to said fluid inlet passage means through a third port provided by said first member, and having a fourth outlet channel fluidly connected to said fluid outlet passage means through a fourth port provided by said first member, and a collar rotatably mounted on said body portion and said head and having an inlet and an outlet and adapted to be axially movable from a first position with said fluid inlet in register with said third inlet channel to a second position with said fluid inlet in register with said fourth inlet channel.

18. The invention according to claim 17 wherein said second member has a first duct fluidly connected to said second inlet channel and a second duct fluidly connected to said second outlet channel, said first member has a third duct fluidly connected to said fluid inlet passage means and a fourth duct fluidly connected to said fluid outlet passage means, and said collar has a slot adapted to fluidly connect together said first and second ducts in said first position and said third and fourth ducts in said second position.

19. The invention according to claim 18 wherein said collar in each of said operative positions is rotatably movable into (1) a drive position for driving the rotatable member, (2) a free-wheeling position preventing fluid from entering said cylinders and having said slot fluidly connect the corresponding ducts for fluidly connecting one cylinder to the opposite cylinder for permitting manual movement of the rotatable member with respect to the fixed member, and (3) a brake position preventing fluid from entering said cylinders and disconnecting said slot from the corresponding ducts for preventing movement of the rotatable member with respect to the fixed member.

20. The invention according to claim 17 wherein said coupling has a substantially U-shaped cross section and is threaded onto one end of said axle.

21. In a fluid motor, the combination comprising: a first member; a second member rotatably supported by said first member; oppositely disposed cylinders carried by one of said first and second members, said first and second members further having first and second fluid passage means respectively for successively introducing a fluid under pressure into said cylinders and successively discharging said fluid therefrom; means interposed between said first and second members for (1) fluidly interconnecting said first and second fluid passage means, (2) forming a bearing, and (3) providing a seal to prevent the escape of said fluid from between said first and second members; and valve means fluidly connected to one of said first and second fluid passage means for controlling the introduction of said fluid therein.

22. The combination according to claim 21 wherein said means interposed between said first and second members is fixed to one of said first and second members.

23. The combination according to claim 22 wherein said fixed means comprises a ring molded in a peripheral groove formed by one of said first and second members.

24. The combination according to claim 23 wherein said ring is provided with fluid directing channels adapted to fluidly interconnect said first and second fluid passage means.

25. The combination according to claim 24 wherein said ring is formed of molded nylon.

References Cited in the file of this patent

UNITED STATES PATENTS

| | | |
|---|---|---|
| 394,684 | Farmer | Dec. 18, 1888 |
| 426,003 | Farmer | Apr. 22, 1890 |
| 1,420,009 | Wilson | June 20, 1922 |